US008339699B2

United States Patent
Falcoz et al.

(10) Patent No.: US 8,339,699 B2
(45) Date of Patent: Dec. 25, 2012

(54) METHOD FOR AMPLIFICATION BY SPATIO-TEMPORAL FREQUENCY CONVERSION AND DEVICE FOR CARRYING OUT SAID METHOD

(75) Inventors: Franck Falcoz, Dourdan (FR); Gilles Cheriaux, Fresnes (FR)

(73) Assignee: Thales, Neuilly sur Seine (FR)

( * ) Notice: Subject to any disclaimer, the term of this patent is extended or adjusted under 35 U.S.C. 154(b) by 608 days.

(21) Appl. No.: 12/307,961

(22) PCT Filed: Jul. 11, 2007

(86) PCT No.: PCT/EP2007/057122
§ 371 (c)(1),
(2), (4) Date: Oct. 23, 2009

(87) PCT Pub. No.: WO2008/006859
PCT Pub. Date: Jan. 17, 2008

(65) Prior Publication Data
US 2010/0053733 A1 Mar. 4, 2010

(30) Foreign Application Priority Data
Jul. 11, 2006 (FR) ...................... 06 06303

(51) Int. Cl.
*H01S 3/10* (2006.01)
*H01S 3/16* (2006.01)

(52) U.S. Cl. ........ 359/349; 359/337; 359/347; 359/348; 372/25

(58) Field of Classification Search .................. 359/347, 359/348, 349, 337; 372/25
See application file for complete search history.

(56) References Cited

U.S. PATENT DOCUMENTS

| 5,095,487 | A | * | 3/1992 | Meyerhofer et al. | 372/23 |
| 5,546,222 | A | * | 8/1996 | Plaessmann et al. | 359/346 |
| 5,847,863 | A | * | 12/1998 | Galvanauskas et al. | 359/341.3 |
| 6,570,704 | B2 | * | 5/2003 | Palese | 359/349 |
| 2002/0131164 | A1 | * | 9/2002 | Palese | 359/349 |
| 2004/0000942 | A1 | | 1/2004 | Kapteyn et al. | |
| 2004/0057475 | A1 | * | 3/2004 | Frankel et al. | 372/25 |

OTHER PUBLICATIONS

Yan, "Pulse Temporal and Spatial Chirping by a Bulk Kerr Medium in a Regenerative Amplifier", IEEE Journal of Quantum Electronics, vol. 30, No. 9, pp. 2194-2202 (Sep. 1994).*

Ohmae, G. et al. "Spatial Spectrum Chirp Characteristic of a Martinez-Type Multipass Pulse Stretcher", Japanese Journal of Applied Physics, Japan Society of Applied Physics, Tokyo, JP, vol. 39, No. 10, Part 1, Oct. 2000, pp. 5864-5869, XP001020629, ISSN: 0021-4922).

Hoffstaedt, A. "Design and Performance of a High-Average-Power Flashlamp-Pumped Ti: Sapphire Laser and Amplifier", IEEE Journal of Quantum Electronics, IEEE Service Center, Piscataway, NJ, US, vol. 33, No. 10, Oct. 1997, pp. 1850-1863, XP011051743, ISSN: 0018-9197.

Zhiyi, Wei et al. "Optimized Design and Construction of 100TW Ti: Sapphire Laser Toward to Phase Controlling, Spectrum Shaping and Wave-Front Correction", LEOS, 2005, IEEE Annual Meeting Conference Proceedings Sydney, Australia Oct. 23-27, 2005, Piscataway, NJ, USA, IEEE, Oct. 23, 2005, pp. 619-620, XP010886708, ISBN: 0-7803-9217-5.

* cited by examiner

*Primary Examiner* — Eric Bolda
(74) *Attorney, Agent, or Firm* — Lowe, Hauptman, Ham & Berner, LLP

(57) ABSTRACT

The present invention relates to a method of amplification based on spatio-temporal frequency drift for a pulse laser comprising a so-called CPA (Chirped Pulse Amplification) frequency-shift amplifying chain, the various spectral components spatially spread. The various components separately amplified.

9 Claims, 5 Drawing Sheets

METHOD FOR AMPLIFICATION BY SPATIO-TEMPORAL FREQUENCY CONVERSION AND DEVICE FOR CARRYING OUT SAID METHOD

CROSS-REFERENCE TO RELATED APPLICATIONS

The present Application is based on International Application No. PCT/EP2007/057122, filed on Jul. 11, 2007, which in turn corresponds to French Application No. 0606303, filed on Jul. 11, 2006, and priority is hereby claimed under 35 USC §119 based on these applications. Each of these applications are hereby incorporated by reference in their entirety into the present application.

BACKGROUND OF THE INVENTION

1. Field of the Invention

The present invention pertains to a method of amplification based on spatio-temporal frequency drift for a pulse laser comprising a so-called CPA (Chirped Pulse Amplification) frequency-drift amplifying chain.

2. Description of Related Art

The production of pulse lasers, of titanium-doped sapphire type, with very large peak power, makes it necessary to control very wide spectra so as to decrease the durations of the pulses at the output of the amplifying chain.

In order to extract the largest part of the energy stored in the amplifying media, the latter are often used in a near-saturation regime. This saturation unfortunately causes in the frequency-drift chains a spectral shift which limits the total band.

A conventional solution for avoiding spectral constriction is to use a pre-compensation, at the start of the chain (before the regenerative or multi-pass amplifier). This filtering-based solution has the drawback of limiting the extraction efficiency of the amplifiers and is all the less effective the larger the number of passes through the amplifiers.

In detail, CPA chains implement frequency-drift technology which is based on the use of wide-spectrum pulses, the stretching of pulses, the amplification and re-compression of these stretched pulses. Typically, in CPA chains based on oscillators comprising Ti:Sa crystals which have a spectrum with a width of 5 to 100 nm, for compressed pulse durations of 150 to 10 fs.

The ability of an amplification chain to maintain a correct spectrum directly influences the ability of the laser to work with short pulses. The spectral constriction induced by the amplifiers is therefore a key factor for obtaining short-duration performance. Likewise, a large deformation of the spectrum, for example asymmetric, disturbs the temporal form and impairs the operation of the laser.

The amplifiers used are of the type with n passes of the beam through the amplifying medium. When n is small (less than 10) the geometric multi-pass configuration is generally used. The pump laser dispatches a pulse into the crystal and the beam to be amplified is thereafter dispatched and performs n passes so as to optimize the extraction in terms of energy.

FIG. 1 diagrammatically depicts a multi-pass amplifier such as this, which essentially comprises a crystal 1 (for example Ti:Sa) receiving, from an input mirror ME, input pulses at an angle differing from the normal to its incidence surface, and several reflecting mirrors M1 to M7 disposed on either side of the crystal 1 so as to cause the beam to pass through the crystal at various angles of incidence, the last mirror M7 reflecting this beam to the output via an output mirror MS.

When a large amplification factor is sought, it is necessary to increase the number of passes and the configuration of FIG. 1 is no longer applicable. The configuration generally used is then the regenerative amplifier, an exemplary embodiment of which is shown diagrammatically in FIG. 2. This type of amplifier makes it possible to readily achieve some thirty or so passes.

The system represented in FIG. 2 comprises a crystal 2 disposed, with a Pockels cell 3, in an optical cavity closed by two mirrors 4, 5 and pumped by a pump 6. A polarizer 7, disposed in the cavity, makes it possible to tap off a part of the intra-cavity beam, the tapped-off beam passing through a half-wave plate 8, a reflecting mirror 9 and a Faraday rotator 10 at the output of which a semi-transparent mirror 11 reflects it back towards the use (beam $E_{out}$). Moreover, the polarizer 7 makes it possible to inject an external beam $E_{in}$ into this cavity.

In both cases (FIGS. 1 and 2), the gain of the amplifier may be written:

$$E_{OUT} = J_{SAT} \cdot S \cdot \ln\left(\frac{J_{STO}}{J_{SAT}}\left(e^{\frac{E_{in}}{SJ_{SAT}}} - 1\right) + 1\right)$$

$J_{STO}$ being the stored fluence available for the gain in the medium (the crystal) and $J_{SAT}$ the saturation fluence of this medium. This is the classical equation from the theory of Frantz and Nodvick.

The table below contains a few examples of values of $J_{SAT}$ for various laser materials:

| Materials | $J_{sat}$ in J/cm² | Spectral range |
| --- | --- | --- |
| Dyes | ~0.001 J/cm² | Visible |
| Excimers | ~0.001 J/cm² | UV |
| Nd:YAG | 0.5 J/cm² | 1064 nm |
| Ti:Al₂O₃ | 1.1 J/cm² | 800 nm |
| Nd:Glass | 5 J/cm² | 1054 nm |
| Alexandrite | 22 J/cm² | 750 nm |
| Cr:LiSAF | 5 J/cm² | 830 nm |

In the small-signal regime, with $J_{IN} \ll J_{SAT}$, the gain relation can be approximated with:

$$G = \frac{E_{OUT}}{E_{IN}} = e^{\left(\frac{J_{STO}}{J_{SAT}}\right)}$$

The amplified pulse being stretched (dispersed), usually positively, a problem has been highlighted by the Applicant. Specifically, chains based on short pulses use a wide-spectrum oscillator and these short pulses are stretched temporally and are thereafter amplified and re-compressed at the output. Such a chain is schematically represented in FIG. 3, this chain essentially comprising an oscillator 12, a stretcher 13, one or more amplification stages 14 and a compression device 15. An exemplary spectrum of a Ti:Sa oscillator signal has been represented in FIG. 4. In this FIG. 4, the spectral phase has been represented as a continuous line.

When the pulse penetrates the amplifier, the initial spectral components see a gain g1 and are amplified. The following components being in the amplifier therefore see a gain g2 which has decreased because the start of the pulse has "consumed" stored energy. The temporal form of the gain has a form of the type of that represented in FIG. 5.

There is an initial gain for the first temporal part of the form:

$$gi = \frac{j_{STO}}{J_{SAT}}$$

and a final gain, which takes account of the extracted energy, of the form:

$$gf = \frac{j_{STI} - J_{ex}}{j_{SAT}}$$

$J_{ex}$ being the amplifier extracted fluence.

The apparent gain is therefore higher for the temporal start of the signal than for the end, thereby inducing a spectral deformation of the amplified signal, as represented in FIG. 6. The curve of FIG. 6 shows the effect of modifying the gain of a laser crystal due to the temporal stretching of the pulses to be amplified. This curve gives the value of the weighted gain (relative gain, as for all the other gain curves) as a function of the wavelength of the amplified signal.

FIG. 7 shows two curves of the shift of the gain due to temporal stretching as a function of wavelength, respectively for one pass and for four passes through the crystal.

In addition to the spectrum shift, a constriction due to the width of the gain band is also observed.

The combination of these two effects therefore greatly limits the performance of the frequency-drift chains, since it limits the re-compression of the incident pulses with a view to obtaining at the output pulses of very short durations, for example of a duration of a few fs.

To compensate for these effects, it is possible to undertake a pre-distortion of the input signal by active or passive filtering at the price of a decrease in the efficiency of the laser (drop in gain). Moreover, the filters used have low efficiencies (<50%) because they act (cut off) spectrally at the energy maximum.

A second solution would consist in having the amplifiers work far from saturation, but in this case the energy that can be extracted from the amplifier is greatly decreased. Moreover, the stability of the pulse at output then depends greatly on the stability of the input pulse.

SUMMARY OF THE INVENTION

One object of the present invention is a method making it possible to optimize the operation of optical amplifiers, in particular those of CPA laser chains, practically without loss of energy and without altering the spectrum of the pulses produced. The subject of the present invention is also a device for implementing this method.

The method in accordance with the invention applies to a frequency-drift laser chain (CPA) optical amplifier, and it is characterized in that it consists in spatially spreading the various spectral components and in separately amplifying these various components.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The invention consists in using a device making it possible to spatially spread the beam to be amplified. This invention operates in any type of amplifier (regenerative or multi-pass) and makes it possible to compensate for spectral shift while benefiting from the saturation operation of amplifiers.

In detail, the invention uses an optical system which makes it possible to spatially spread the various spectral components of the pulse that one wishes to amplify so as to prevent these components from sharing the same spatial zone of gain during amplification. The immediate consequence is that the saturation effect will be distributed over the whole of the spectral band of the pulse instead of occurring only on the infrared edge. Control of the spatial spreading of the various spectral components of the pulse makes it possible to distribute the gain as a function of the form of the pumped zone and of the temporal stretching.

For a given configuration, it will therefore be possible to obtain a uniform gain over the whole of the spectral band and to circumvent the shift effects due to saturation. Once the components have been amplified to the desired value, it suffices to pass them through an optical system for spatial compression making it possible to superimpose the spectral components.

Figure 1:
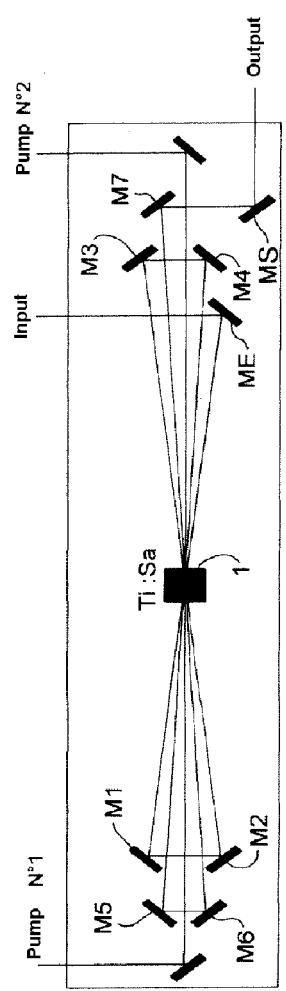
FIG. 1, already described above, is a simplified diagram of a multi-pass amplifier stage of a CPA chain, FIG. 2, already described above, is a diagram of a regenerative amplifier of the prior art, FIG. 3, already mentioned above, is a simplified diagram of a conventional CPA chain, FIG. 4, already mentioned above, is a chart of an exemplary curve of the evolution of the spectrum of a Ti:Sa oscillator and of its spectral phase, FIG. 5, already mentioned above, is a simplified diagram indicating the parts of a pulse signal that are acted on by an amplifier of a CPA chain, FIGS. 6 and 7, already mentioned above, are various gain curves highlighting problems encountered in conventional CPA chains.
Figure 2:
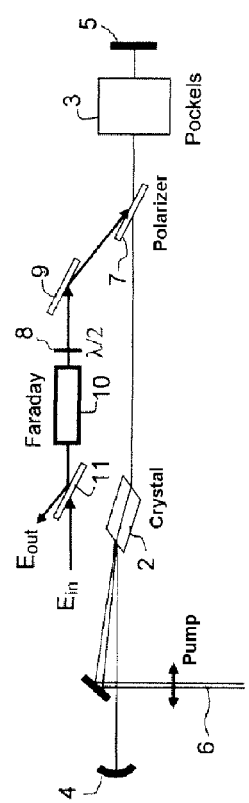
Figure 3:
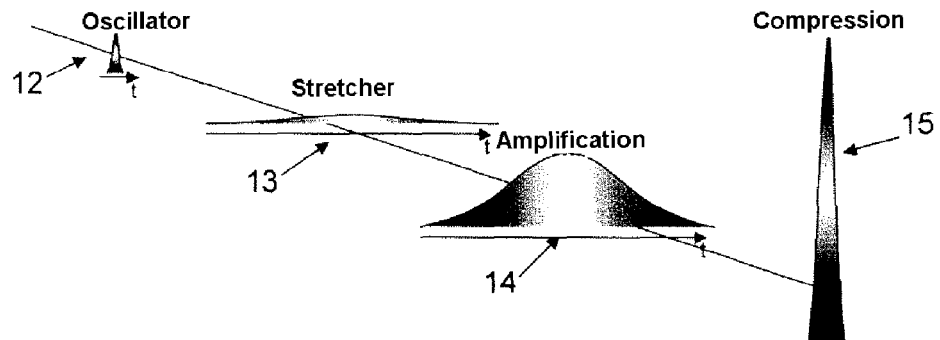
Figure 4:
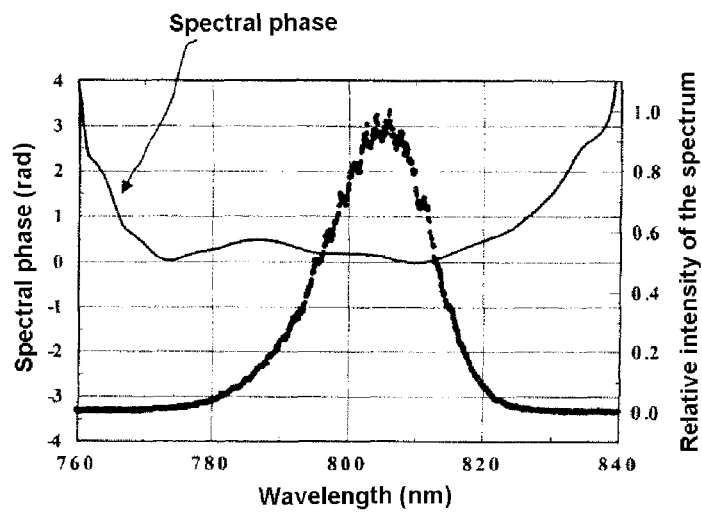
Figure 5:
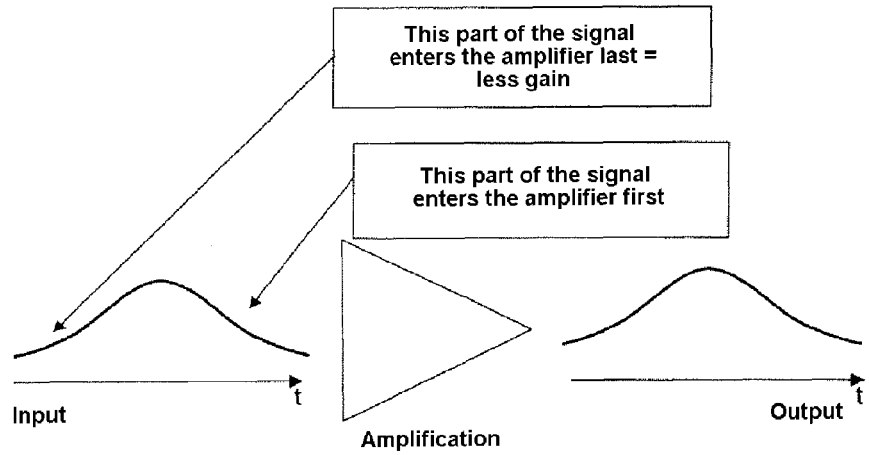
Figure 6:
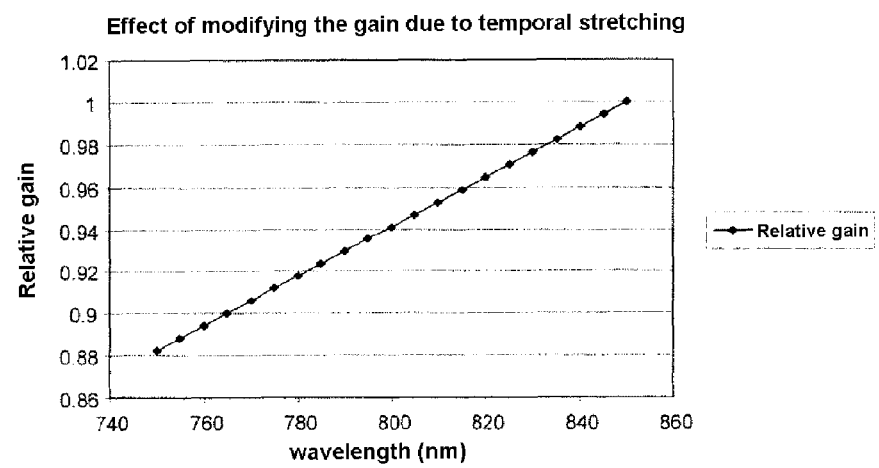
Figure 7:
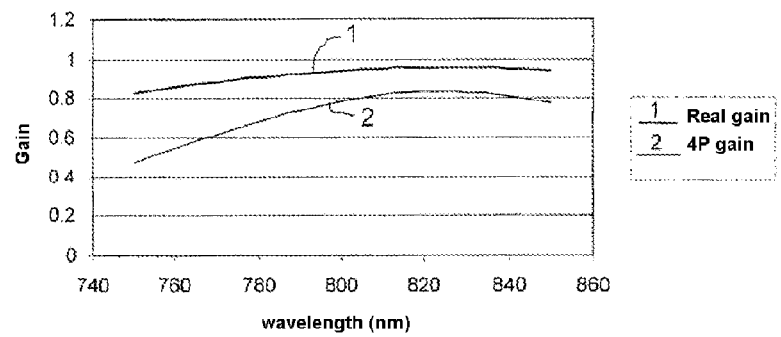
Figure 8:
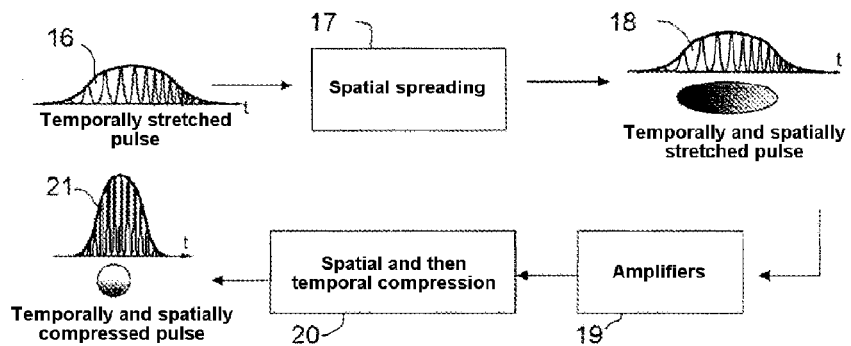
FIG. 8 is a diagram of a CPA chain in accordance with the invention and showing how the method of the invention is applied.

The device of the invention has been represented in a simplified manner in FIG. 8. The example of an incident pulse 16 is taken. It is already stretched temporally in a conventional manner, and passes firstly through a spatial stretching device 17, at the output of which is obtained a pulse 18 which is both temporally and spatially stretched. This pulse 18 is amplified by an amplification device 19 comprising one or more optical amplifier stages. Thereafter it is compressed spatially and then temporally by a device 20, at the output of which is obtained an amplified and spatially and temporally compressed pulse 21.

Two conditions must jointly hold in order for the device of the invention to operate correctly. The first is that the pulse must be spatially collimated (the spectral components must be parallel) so as to avoid the mixing of the gain zones as the pulse propagates through the amplifiers. The second is that the spatial spreading optical system used at input (at 7) must exhibit a law that is substantially inverse (taking account of any effects of spectral aberration in the spatial domain, effects due to the amplification) to that of the optical system used at output (at 10) in the guise of compressor, as is the case for a stretcher and a compressor in a conventional CPA system.

Figure 9:
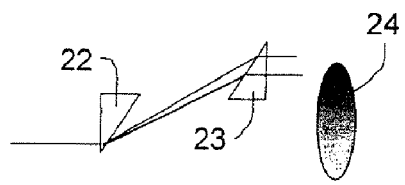
FIG. 9 is a simplified diagram of a device for spatially spreading the spectral components of a light pulse, device used by the invention.

An exemplary embodiment of the spatial spreading device 17 has been represented in FIG. 9. This example is a row of prisms, comprising in the present example two prisms 22, 23 placed on the route of the pulse that one wishes to amplify, but of course this row can comprise more than two prisms. On output from this set of prisms, the pulse is spread spectrally and its cross section 24 exhibits, in the example represented, an elliptical spatial geometry. This spread pulse is thereafter dispatched into an amplifying crystal whose pumping zone (therefore gain zone) is circular (it is also advantageous to tailor the form of the gain zone to the form of the pulse that one wishes to amplify). If the pumping is uniform, it may be considered that the total gain G0 is uniformly distributed over the pumped surface, as represented in FIG. 10.

Figure 10:
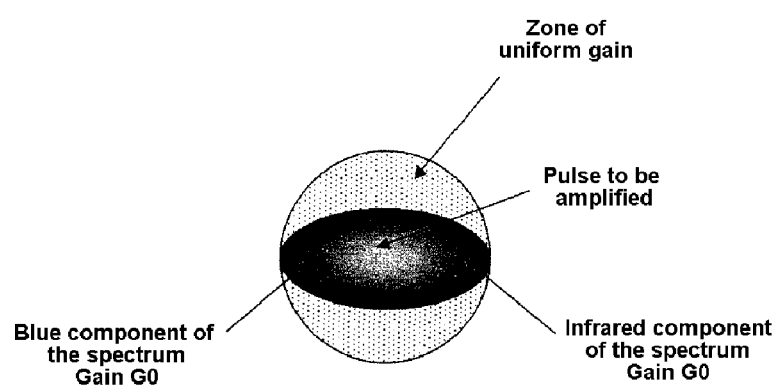
FIG. 10 is a diagram showing an example of pumping zones for a laser crystal used in accordance with the invention.

Since the pulse is temporally stretched, the first spectral component entering the crystal is the smallest wavelength and will be situated for example in the right part of the gain zone (as seen in FIG. 10). The last spectral component to enter the amplifying crystal will be the blue part which will see the left part of the gain zone. As the various components progress through the crystal, each spectral component will therefore have its own gain zone and the saturation will arise in an equivalent manner for all the spectral components. The spectrum of the pulse injected into the amplifier will therefore be preserved.

It then suffices to return the pulse available at the output of the amplifiers towards a spatial compression device based on prisms so as to spatially superimpose the various spectral components.

The advantages exhibited by the device of the invention are the following. It makes it possible to dispense with the spectral filtering generally used on input to the amplifying chains so as to limit the effects due to saturation. It is applicable to any type of amplifier operating in a near-saturation regime, in particular regenerative and multi-pass amplifiers. It is applicable to amplifier stages comprising all sorts of laser materials, for example titanium-doped sapphire.

Control of the spatial spreading of the spectrum makes it possible not only to compensate for the effects related to saturation, but also to shape the spectrum by favoring for example certain spectral components. This control can be done either by the spreading device or by adding an optical component such as a liquid crystal matrix.

The form of the gain zone can be tailored to the spatial form of the pulse to be amplified so as to maximize the extraction.

Any type of known optical device making it possible to spatially spread the spectrum may be used. It may be advantageous to use the same device at amplifier input and output to compensate for the spatial "chirp".

In conclusion, an essential characteristic of the invention is the introduction of a spatial "chirp" on the pulse that one wishes to amplify. The invention makes it possible for amplifier systems to be operated in the saturation regime without undergoing spectrum deformation effects. It makes it possible to attain shorter pulse durations while maintaining a wide spectrum during the amplification phases, doing so while maximizing the efficiency of the laser. It is therefore a novel method of amplifying short pulses which is based on spatial stretching combined with temporal stretching.

It will be readily seen by one of ordinary skill in the art that the present invention fulfills all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of amplification based on spatio-temporal frequency drift for a pulse laser, comprising a frequency-drift amplifying chain, including in order:
 temporally stretching pulses of the pulse laser;
 spatially spreading the various spectral components of the pulses;
 separately amplifying the various spectral components;
 spatially compressing the amplified pulses; and
 temporally compressing the spatially compressed pulses.

2. The method as claimed in claim 1, wherein the various spectral components are collimated spatially during their spatial spreading.

3. The method as claimed in claim 1, wherein the spatial spreading is controlled so as to shape the spectrum of the pulse comprising said spectral components.

4. The method as claimed in claim 1, wherein the spatial spreading of the various spectral components of the pulse is controlled so as to distribute the gain as a function of the form of the pumped zone and of the temporal stretching.

5. An amplification device with spatio-temporal frequency drift for a pulse laser, comprising a frequency-drift amplifying chain, wherein this device comprises in order of a pass of each pulse of the pulse laser:
 a device for temporally stretching pulses of the pulse laser;
 a device for spatially spreading the pulses;
 amplification stages for amplifying the spread pulses;
 a device for spatially compressing the amplified pulses; and
 a device for temporally compressing the spatially compressed pulses.

6. The device as claimed in claim 5, wherein the device for spatially spreading and the device for spatially compressing the pulses each comprise at least two prisms.

7. The device as claimed in claim 5, wherein the compression law of the spatial compression device is substantially inverse to the spreading law of the spatial spreading optical system.

8. The device as claimed in claim 5, wherein the amplifying chain comprises in at least one amplifier stage a Ti:Sa laser crystal.

9. A pulse laser, comprising an amplification device with spatio-temporal frequency drift as claimed in claim 5.

\* \* \* \* \*